US010533266B2

United States Patent
Humfeld et al.

(10) Patent No.: US 10,533,266 B2
(45) Date of Patent: Jan. 14, 2020

(54) LAYERED CARBON FIBER

(71) Applicant: The Boeing Company, Chicago, IL (US)

(72) Inventors: Keith Daniel Humfeld, Federal Way, WA (US); Scott Hartshorn, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/978,011

(22) Filed: May 11, 2018

(65) Prior Publication Data

US 2019/0345645 A1    Nov. 14, 2019

(51) Int. Cl.
| | | |
|---|---|---|
| *D01F 8/18* | (2006.01) | |
| *C01B 32/168* | (2017.01) | |
| *C01B 32/205* | (2017.01) | |
| *D01F 9/12* | (2006.01) | |
| *D06M 10/10* | (2006.01) | |
| *D06M 15/31* | (2006.01) | |
| *D06M 15/71* | (2006.01) | |
| *D06B 3/04* | (2006.01) | |
| *D06M 101/40* | (2006.01) | |

(52) U.S. Cl.
CPC ............. *D01F 8/18* (2013.01); *C01B 32/168* (2017.08); *C01B 32/205* (2017.08); *D01F 9/12* (2013.01); *D06B 3/04* (2013.01); *D06M 10/10* (2013.01); *D06M 15/31* (2013.01); *D06M 15/71* (2013.01); *D06M 2101/40* (2013.01); *D10B 2101/122* (2013.01); *D10B 2401/00* (2013.01); *D10B 2505/02* (2013.01)

(58) Field of Classification Search
CPC ................................................ C01B 32/205
See application file for complete search history.

(56) References Cited

U.S. PATENT DOCUMENTS

| | | | | |
|---|---|---|---|---|
| 2002/0127330 A1* | 9/2002 | Jin | ........................ | B32B 27/08 427/162 |
| 2010/0035063 A1* | 2/2010 | Shekhawat | ............ | B82Y 30/00 428/407 |
| 2013/0149523 A1* | 6/2013 | Tsotsis | ..................... | D01D 5/24 428/297.4 |
| 2015/0069666 A1* | 3/2015 | Jeong | ....................... | D01F 1/10 264/434 |

FOREIGN PATENT DOCUMENTS

| | | |
|---|---|---|
| CN | 101956252 A | 1/2011 |
| CN | 102181964 A | 9/2011 |
| WO | WO2012108607 A1 | 8/2012 |

OTHER PUBLICATIONS

"Is carbon fibre a crystalline or amorphous solid?," Quora, 4 pages, accessed May 11, 2018, https://www.quora.com/Is-carbon-fibre-a-crystalline-or-amorphous-solid.
Chakraborty, "Carbon Fibres," SlideShare, 23 pages, Apr. 3, 2016, accessed May 11, 2018, https://www.slideshare.net/SnigdhaChakraborty3/carbon-fibressnigdha.
European Patent Office Extended Search Report, dated Sep. 25, 2019, regarding Application No. 19165301.3, 5 pages.

* cited by examiner

*Primary Examiner* — Robert A Vetere
(74) *Attorney, Agent, or Firm* — Yee & Associates, P.C.

(57) ABSTRACT

A carbon nanotube yarn is coated with polyacrylonitrile to form a coated carbon nanotube yarn. The polyacrylonitrile is converted to crystalline carbon to form a layered carbon fiber with a sheath of the crystalline carbon and a core of the carbon nanotube yarn.

28 Claims, 6 Drawing Sheets

LAYERED CARBON FIBER

BACKGROUND INFORMATION

1. Field

The present disclosure relates generally to carbon fibers and, more specifically, to forming a layered carbon fiber comprising a sheath and a core.

2. Background

Carbon fibers are conventionally made from polyacrylonitrile (PAN). The polyacrylonitrile is extruded into fiber shapes. Afterwards, the fiber shapes are stretched to somewhat align the polymer molecules, and then go through a carbonization process and a graphitization process.

Due to the thickness of each individual fiber, there is a temperature gradient through the thickness of the fiber. As a result of the temperature gradient, the carbon on the exterior of the fiber is crystallized more and more rapidly than does the carbon in the middle of the fiber. The crystalline graphitic region provides increased modulus due to the sp2 bond structure. The carbon in the middle of the fiber is an amorphous carbon that does not desirably contribute to the modulus. The amorphous carbon in the center of the fiber is undesirable weight.

Therefore, it would be desirable to have a method and apparatus that takes into account at least some of the issues discussed above, as well as other possible issues.

SUMMARY

An illustrative embodiment of the present disclosure provides a method. A carbon nanotube yarn is coated with polyacrylonitrile to form a coated carbon nanotube yarn. The polyacrylonitrile is converted to crystalline carbon to form a layered carbon fiber with a sheath of the crystalline carbon and a core of the carbon nanotube yarn.

Another illustrative embodiment of the present disclosure provides a method. A carbon nanotube yarn is dip-coated with polyacrylonitrile. A carbon layer is formed on the carbon nanotube yarn by performing a carbonization process on the polyacrylonitrile. A sheath of crystalline carbon is formed on the carbon nanotube yarn by performing a graphitization process on the carbon layer.

Yet another illustrative embodiment of the present disclosure provides a layered carbon fiber. The layered carbon fiber comprises a sheath of crystalline carbon and a core of carbon nanotube yarn.

A further illustrative embodiment of the present disclosure provides a system configured to form a layered carbon fiber. The system comprises a bath of polyacrylonitrile, a movement system, a carbonization system, and a graphitization system. The movement system is configured to move a carbon nanotube yarn through the bath of polyacrylonitrile. The carbonization system is configured to receive a coated carbon nanotube yarn comprising polyacrylonitrile on the carbon nanotube yarn. The graphitization system is configured to form a layered carbon fiber from a carbon layer on the carbon nanotube yarn.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that carbon nanotube (CNT) yarn is a bundle of tangled carbon nanotubes without binder. The illustrative embodiments recognize and take into account that there are two conventional methods of forming carbon nanotube yarn. The illustrative embodiments recognize and take into account that one method to form carbon nanotube yarn is to draw it from a forest of vertically aligned carbon nanotubes, optionally twisting the yarn as it is pulled. The illustrative embodiments recognize and take into account that another method to form carbon nanotube yarn is wet spinning. The illustrative embodiments recognize and take into account that to use wet spinning, a stream of carbon nanotubes is injected in a solvent into a circulating bath of a fluid in which the solvent is soluble. The solvent disperses and the carbon nanotubes bunch together.

Figure 1:
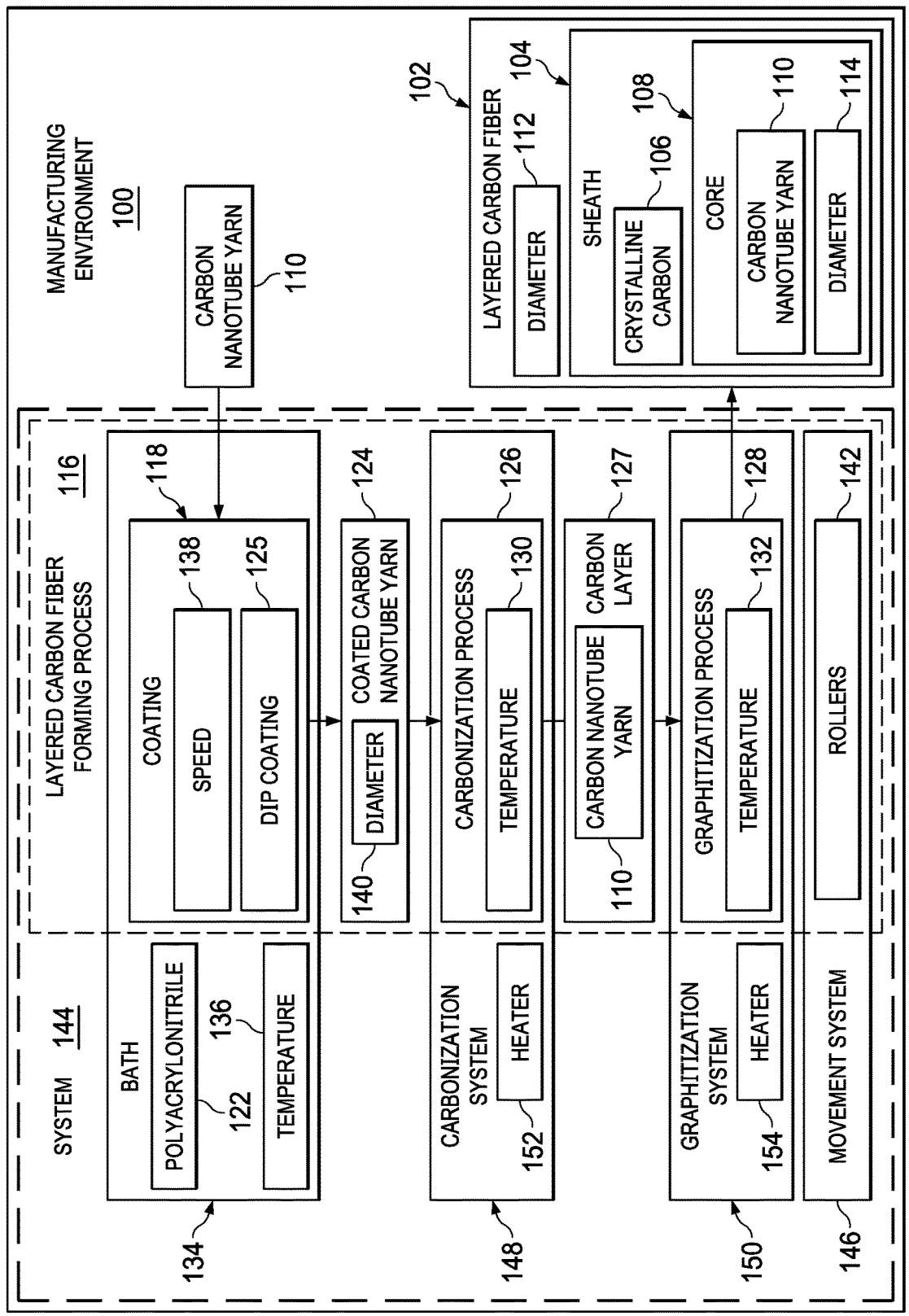
FIG. 1 is an illustration of a block diagram of a manufacturing environment in which a layered carbon fiber is manufactured in accordance with an illustrative embodiment.

Turning now to FIG. 1, an illustration of a block diagram of a manufacturing environment in which a composite structure is manufactured is depicted in accordance with an illustrative embodiment. In manufacturing environment 100, layered carbon fiber 102 is generated. Layered carbon fiber 102 comprises sheath 104 of crystalline carbon 106 and core 108 of carbon nanotube yarn 110.

Layered carbon fiber 102 has diameter 112. Diameter 112 of layered carbon fiber 102 has any desirable value. In some illustrative examples, diameter 112 of layered carbon fiber 102 is in the range of 3 microns to 10 microns.

Carbon nanotube yarn 110 has diameter 114. Diameter has any desirable value. In some illustrative examples, diameter 114 of carbon nanotube yarn 110 is in the range of 1.5 microns to 2.5 microns.

Layered carbon fiber 102 is formed using layered carbon fiber forming process 116. Layered carbon fiber forming process 116 comprises coating 118 carbon nanotube yarn 110 with polyacrylonitrile 122 to form coated carbon nanotube yarn 124. In some illustrative examples, coating 118 is referred to as dip coating 125. Polyacrylonitrile 122 on coated carbon nanotube yarn 124 is converted to crystalline carbon 106 to form layered carbon fiber 102 with sheath 104 of crystalline carbon 106 and core 108 of carbon nanotube yarn 110.

In some illustrative examples, converting polyacrylonitrile 122 to crystalline carbon 106 comprises applying carbonization process 126 to convert polyacrylonitrile 122 to carbon layer 127, and applying graphitization process 128 to convert carbon layer 127 to crystalline carbon 106. Carbonization process 126 is performed at temperature 130. In some illustrative examples, temperature 130 of carbonization process 126 is in a range of 800 degrees Celsius to 1200 degrees Celsius. In some illustrative examples, temperature 130 is approximately 1000 degrees Celsius.

Graphitization process 128 is performed at temperature 132. In some illustrative examples, temperature 132 is in the range of 1,200 degrees Celsius to 3,000 degrees Celsius.

In some illustrative examples, coating 118 carbon nanotube yarn 110 with polyacrylonitrile 122 comprises sending carbon nanotube yarn 110 through bath 134 of polyacrylonitrile 122. In these illustrative examples, temperature 136 of polyacrylonitrile 122 in bath 134 and speed 138 of carbon nanotube yarn 110 passing through bath 134 affect a thickness of polyacrylonitrile 122 on coated carbon nanotube yarn 124. Temperature of polyacrylonitrile 122 in bath 134 and speed 138 of carbon nanotube yarn 110 passing through bath 134 are adjusted to achieve a desired thickness of polyacrylonitrile 122 on coated carbon nanotube yarn 124.

Coated carbon nanotube yarn 124 has diameter 140. In some illustrative examples, coated carbon nanotube yarn 110 has diameter 140 in the range of 5 microns to 13 microns.

Layered carbon fiber 102 may be used to replace traditional carbon fibers in structural applications. For example, layered carbon fiber 102 may be used to replace traditional carbon fibers in composite materials.

In some illustrative examples, carbon nanotube yarn 110 is propelled through layered carbon fiber forming process 116 using rollers 142. In some illustrative examples, one of rollers 142 is present in coating 118 process. In some illustrative examples, the next roller of rollers 142 is positioned within or after carbonization process 126. When the next roller of rollers 142 is positioned within or after carbonization process 126, rollers 142 do not displace polyacrylonitrile 122 on coated carbon nanotube yarn 124. When the next roller of rollers 142 is positioned within or after carbonization process 126, polyacrylonitrile 122 on coated carbon nanotube yarn 124 has solidified on carbon nanotube yarn 110 before the next roller contacts carbon nanotube yarn 110. In some illustrative examples, the next roller contacts carbon layer 127 after carbonization process 126.

As depicted, layered carbon fiber forming process 116 is performed in system 144. System 144 is configured to form layered carbon fiber 102. System 144 comprises bath 134 of polyacrylonitrile 122, movement system 146, carbonization system 148, and graphitization system 150.

Movement system 146 is configured to move carbon nanotube yarn 110 through bath 134 of polyacrylonitrile 122. Carbonization system 148 is configured to receive coated carbon nanotube yarn 124 comprising polyacrylonitrile 122 on the carbon nanotube yarn 110. Graphitization system 150 is configured to form layered carbon fiber 102 from carbon layer 127 on carbon nanotube yarn 110.

As depicted, movement system 146 comprises rollers 142. In some illustrative examples, a roller of rollers 142 is in bath 134 of polyacrylonitrile 122.

In some illustrative examples, a second roller of rollers 142 is within carbonization system 148. In some illustrative examples, carbonization system 148 is between the roller and a second roller of rollers 142.

In some illustrative examples, carbonization system 148 comprises heater 152 configured to maintain a temperature in the range of 800 degrees Celsius to 1,200 degrees Celsius. In some illustrative examples, graphitization system 150 comprises heater 154 configured to maintain a temperature in the range of 1,200 degrees Celsius to 3,000 degrees Celsius.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, manufacturing environment 100 may further comprise manufacturing equipment for carbon nanotube yarn 110. In other illustrative examples, carbon nanotube yarn 110 is manufactured outside of manufacturing environment 100.

As another example, although bath 134 is depicted, any desirable system for performing coating 118 may be used. In other illustrative examples, coating 118 is performed using a deposition system other than bath 134.

Figure 2:
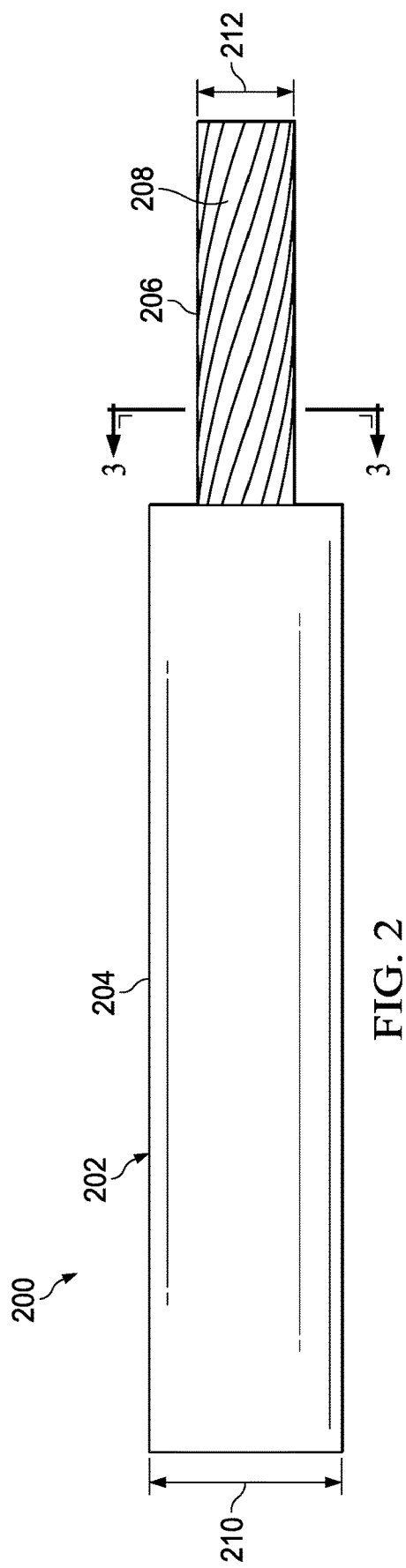
FIG. 2 is an illustration of a side view of a layered carbon fiber with a portion of a sheath cut away in accordance with an illustrative embodiment.

Turning now to FIG. 2, an illustration of a side view of a layered carbon fiber with a portion of a sheath cut away is depicted in accordance with an illustrative embodiment. Layered carbon fiber 200 is a physical implementation of layered carbon fiber 102 of FIG. 1.

Layered carbon fiber 200 comprises sheath 202 of crystalline carbon 204 and core 206 of carbon nanotube yarn 208. As depicted, a portion of sheath 202 is cut away to make core 206 visible in FIG. 2. As depicted, layered carbon fiber 200 has diameter 210 and carbon nanotube yarn 208 has diameter 212. In some illustrative examples, diameter 212 is approximately 2 microns. In some illustrative examples, diameter 210 is in the range of 5 microns to 13 microns.

Figure 3:
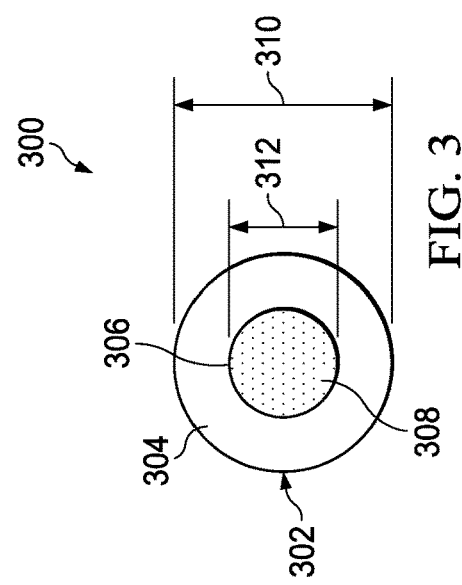
FIG. 3 is an illustration of a cross-sectional view of a layered carbon fiber in accordance with an illustrative embodiment.

Turning now to FIG. 3, an illustration of a cross-sectional view of a layered carbon fiber is depicted in accordance with an illustrative embodiment. Layered carbon fiber 300 is a physical implementation of layered carbon fiber 102 of FIG. 1. In some illustrative examples, layered carbon fiber 300 is the same as layered carbon fiber 200 of FIG. 2.

Layered carbon fiber 300 comprises sheath 302 of crystalline carbon 304 and core 306 of carbon nanotube yarn 308. As depicted, layered carbon fiber 300 has diameter 310 and carbon nanotube yarn 308 has diameter 312. In some illustrative examples, diameter 312 is approximately 2 microns. In some illustrative examples, diameter 310 is in the range of 5 microns to 13 microns.

Figure 4:
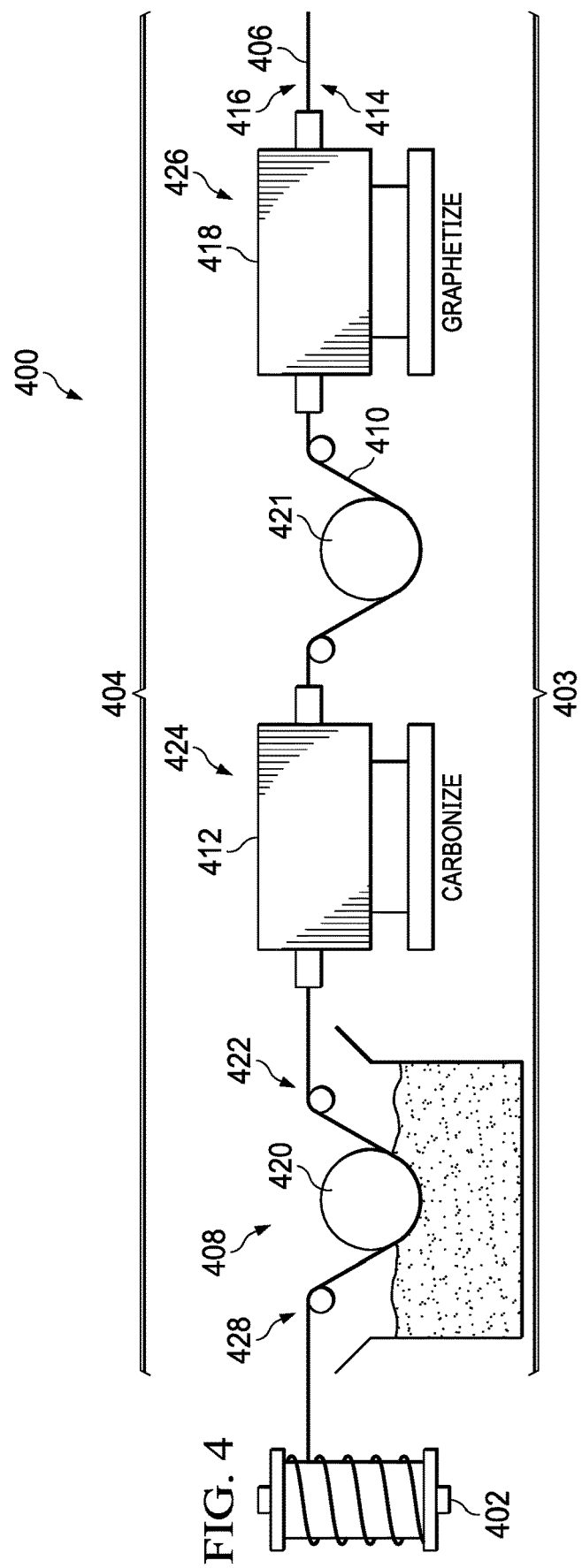
FIG. 4 is an illustration of a graphical depiction of a manufacturing environment in which a layered carbon fiber is manufactured in accordance with an illustrative embodiment.

Turning now to FIG. 4, an illustration of a graphical depiction of a manufacturing environment in which a layered carbon fiber is manufactured is depicted in accordance with an illustrative embodiment. Manufacturing environment 400 is a representation of manufacturing environment 100 of FIG. 1.

Manufacturing environment 400 has carbon nanotube yarn 402 that is supplied to system 403 performing layered carbon fiber forming process 404. As depicted, fiber forming process 404 comprises coating 408, carbonization process 412, and graphitization process 418. As depicted, system 403 comprises bath 422, carbonization system 424, graphitization system 426, and movement system 428.

Layered carbon fiber 406 is formed by coating 408 carbon nanotube yarn 402 with polyacrylonitrile, forming carbon layer 410 on carbon nanotube yarn 402 by performing carbonization process 412 on the polyacrylonitrile, and forming sheath 414 of crystalline carbon 416 on carbon nanotube yarn 402 by performing graphitization process 418 on carbon layer 410. As depicted, coating 408 is performed in bath 422.

Carbonization process 412 is performed at any desirable temperature to remove hydrogen and nitrogen atoms from the polyacrylonitrile. Carbonization process 412 is performed in carbonization system 424. In some illustrative examples, forming carbon layer 410 comprises heating the polyacrylonitrile on carbon nanotube yarn 402 at a temperature in the range of 800 degrees Celsius to 1200 degrees Celsius to remove hydrogen and nitrogen atoms and form carbon layer 410 from the polyacrylonitrile on carbon nanotube yarn 402.

Graphitization process 418 is performed in graphitization system 426. Graphitization process 418 is performed at any desirable temperature to crystallize carbon layer 410. In some illustrative examples, graphitization process 418 heats carbon layer 410 on carbon nanotube yarn 402 at a temperature in the range of 1200 degrees Celsius to 3000 degrees Celsius.

As depicted, coating 408 is performed using roller 420. A second roller may be used to pull carbon nanotube yarn 402 through layered carbon fiber forming process 404. In some illustrative examples, roller 421 is positioned inside or following carbonization process 412. By roller 421 being positioned after or inside carbonization process 412, roller 421 does not undesirably remove polyacrylonitrile from carbon nanotube yarn 402. By roller 421 being positioned after or inside carbonization process 412, roller 421 contacts carbon nanotube yarn 402 when the coating of either polyacrylonitrile or carbon is firm on carbon nanotube yarn 402.

Any desirable quantity of rollers is present to move carbon nanotube yarn 402 through layered carbon fiber forming process 404. Also, the rollers may have any desirable locations within system 403 configured to perform carbon fiber forming process 404. Roller 420 and any other rollers in system 403 are components of movement system 428.

Figure 5:
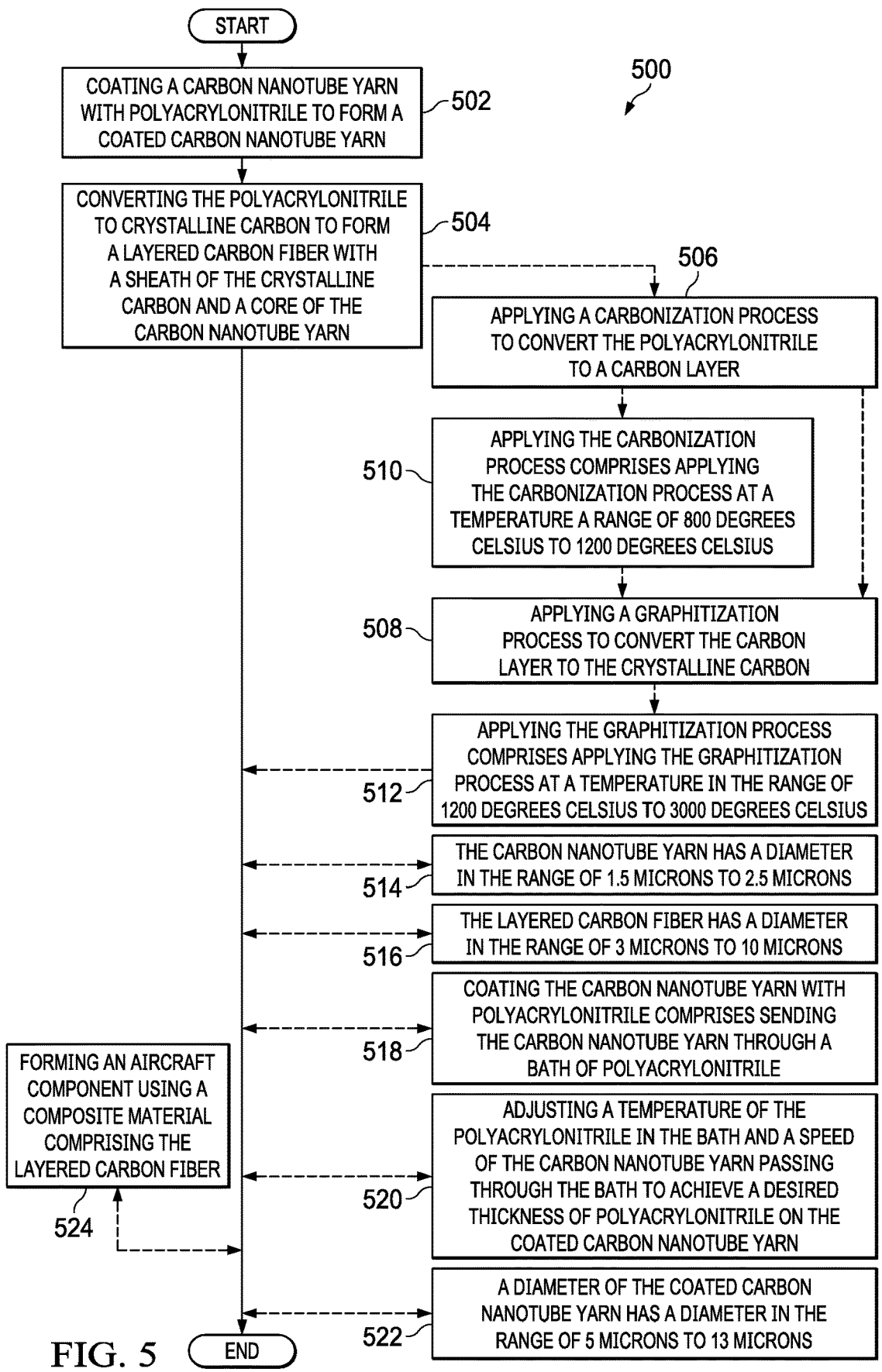
FIG. 5 is an illustration of a flowchart of a method for forming a layered carbon fiber in accordance with an illustrative embodiment.

Turning now to FIG. 5, an illustration of a flowchart of a method for forming a layered carbon fiber is depicted in accordance with an illustrative embodiment. Method 500 is an implementation of layered carbon fiber forming processing 116 of FIG. 1. Method 500 may be used to create layered carbon fiber 200 of FIG. 2. Method 500 may be used to create layered carbon fiber 300 of FIG. 3. Method 500 may be implemented in manufacturing environment 400 of FIG. 4.

Method 500 coats a carbon nanotube yarn with polyacrylonitrile to form a coated carbon nanotube yarn (operation 502). Method 500 converts the polyacrylonitrile to crystalline carbon to form a layered carbon fiber with a sheath of the crystalline carbon and a core of the carbon nanotube yarn (operation 504). Afterwards, method 500 terminates.

In some illustrative examples, converting the polyacrylonitrile to crystalline carbon comprises applying a carbonization process to convert the polyacrylonitrile to a carbon layer (operation 506) and applying a graphitization process to convert the carbon layer to the crystalline carbon (operation 508). In some illustrative examples, applying the carbonization process comprises applying the carbonization process at a temperature in a range of 800 degrees Celsius to 1,200 degrees Celsius (operation 510). In some illustrative examples, applying the graphitization process comprises applying the graphitization process at a temperature in the range of 1,200 degrees Celsius to 3,000 degrees Celsius (operation 512).

In some illustrative examples, the carbon nanotube yarn has a diameter in the range of 1.5 microns to 2.5 microns (operation 514). In some illustrative examples, the layered carbon fiber has a diameter in the range of 3 microns to 10 microns (operation 516).

In some illustrative examples coating the carbon nanotube yarn with polyacrylonitrile comprises sending the carbon nanotube yarn through a bath of polyacrylonitrile (operation 518). In some illustrative examples, method 500 further comprises adjusting a temperature of the polyacrylonitrile in the bath and a speed of the carbon nanotube yarn passing through the bath to achieve a desired thickness of polyacrylonitrile on the coated carbon nanotube yarn (operation 520). In some illustrative examples, the coated carbon nanotube yarn has a diameter in the range of 5 microns to 13 microns (operation 522). In some illustrative examples, method 500 forms an aircraft component using a composite material comprising the layered carbon fiber (operation 524).

Figure 6:
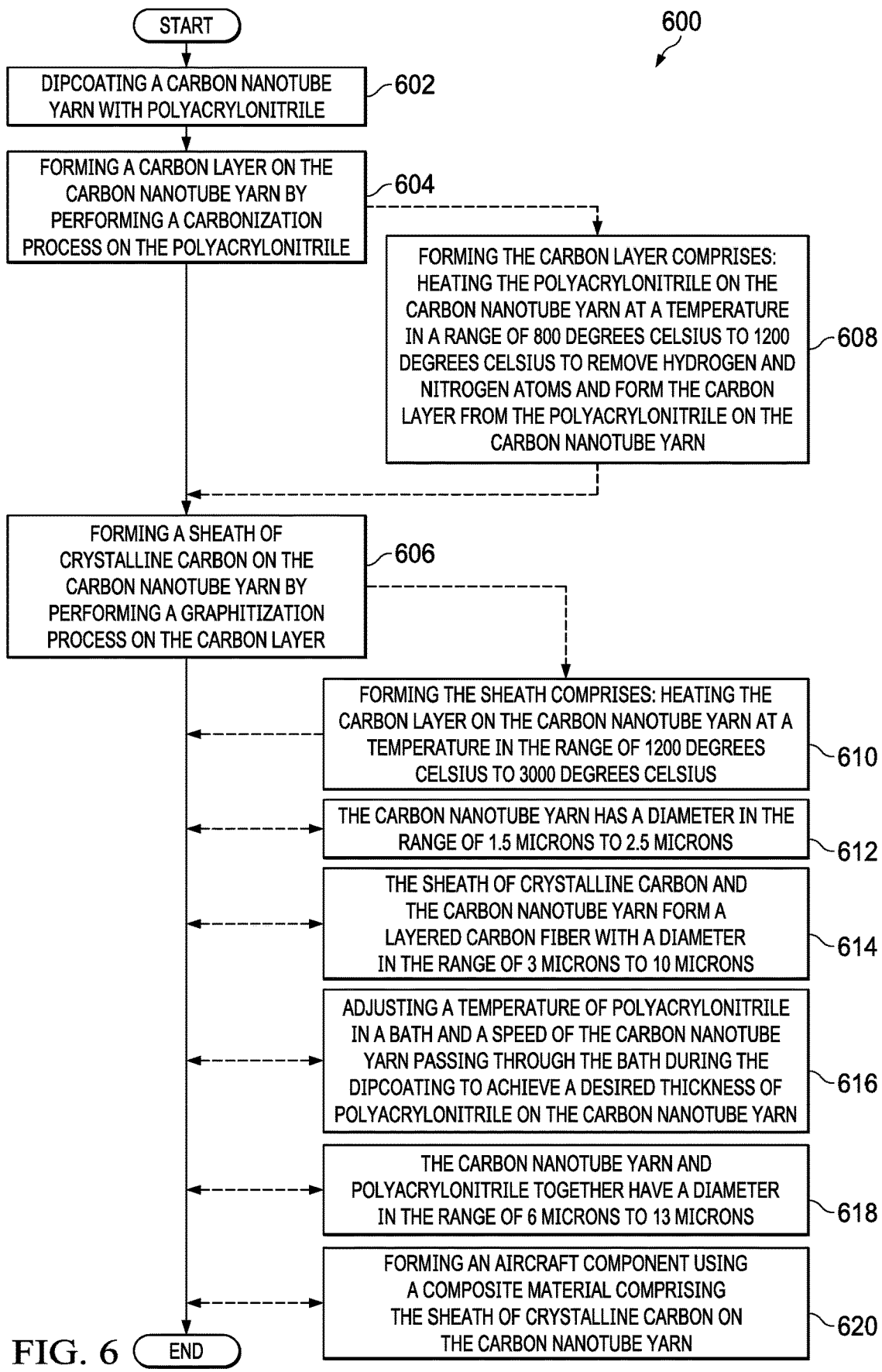
FIG. 6 is an illustration of a flowchart of a method for forming a layered carbon fiber in accordance with an illustrative embodiment.

Turning now to FIG. 6, an illustration of a flowchart of a method for forming a layered carbon fiber is depicted in accordance with an illustrative embodiment. Method 600 is an implementation of layered carbon fiber forming processing 116 of FIG. 1. Method 600 may be used to create layered carbon fiber 200 of FIG. 2. Method 600 may be used to create layered carbon fiber 300 of FIG. 3. Method 600 may be implemented in manufacturing environment 400 of FIG. 4.

Method 600 dip-coats a carbon nanotube yarn with polyacrylonitrile (operation 602). Method 600 forms a carbon layer on the carbon nanotube yarn by performing a carbonization process on the polyacrylonitrile (operation 604). Method 600 forms a sheath of crystalline carbon on the carbon nanotube yarn by performing a graphitization process on the carbon layer (operation 606). Afterwards, method 600 terminates.

In some illustrative examples, forming the carbon layer comprises heating the polyacrylonitrile on the carbon nanotube yarn at a temperature in the range of 800 degrees Celsius to 1,200 degrees Celsius to remove hydrogen and nitrogen atoms and form the carbon layer from the polyacrylonitrile on the carbon nanotube yarn (operation 608). In some illustrative examples, forming the sheath comprises heating the carbon layer on the carbon nanotube yarn at a temperature in the range of 1,200 degrees Celsius to 3,000 degrees Celsius (operation 610).

In some illustrative examples, the carbon nanotube yarn has a diameter in the range of 1.5 microns to 2.5 microns (operation 612). In some illustrative examples, the sheath of crystalline carbon and the carbon nanotube yarn form a layered carbon fiber with a diameter in the range of 3 microns to 10 microns (operation 614).

In some illustrative examples, method 600 further comprises adjusting a temperature of polyacrylonitrile in a bath and a speed of the carbon nanotube yarn passing through the bath during the dip-coating to achieve a desired thickness of polyacrylonitrile on the carbon nanotube yarn (operation 616). In some illustrative examples, the carbon nanotube yarn and polyacrylonitrile together have a diameter in the range of 5 microns to 13 microns (operation 618). In some illustrative examples, forming an aircraft component using a composite material comprising the sheath of crystalline carbon on the carbon nanotube yarn (operation 620).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 500 or method 600 are performed. For example, operations 506 through 524 of FIG. 5 may be optional. As another example, operations 608 through 620 of FIG. 6 may be optional.

Figure 7:
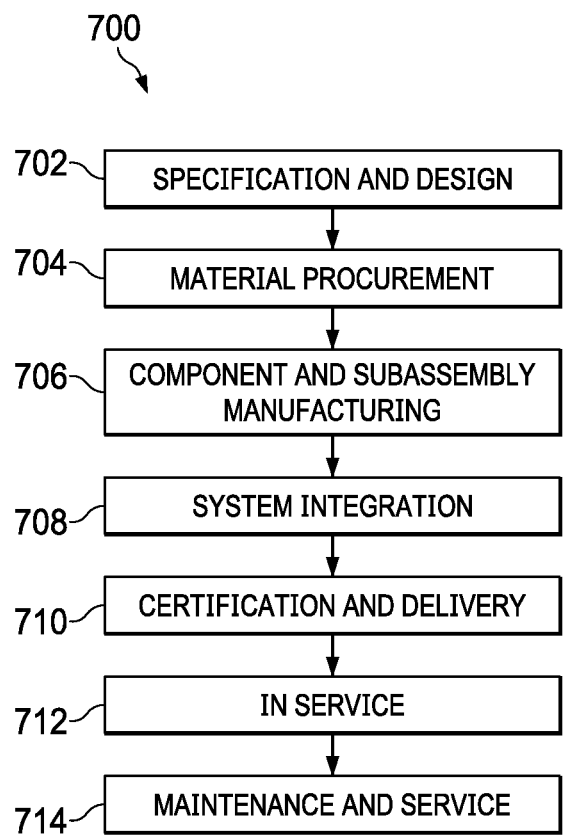
FIG. 7 is an illustration of an aircraft manufacturing and service method in the form of a block diagram in accordance with an illustrative embodiment.
Figure 8:
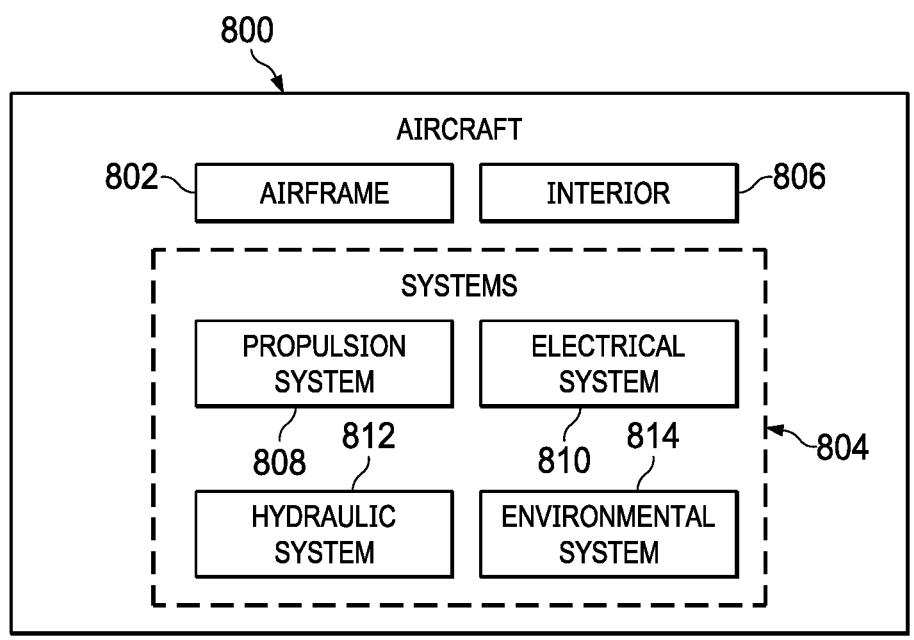
FIG. 8 is an illustration of an aircraft in the form of a block diagram in which an illustrative embodiment may be implemented.

The illustrative examples of the present disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in accordance with an illustrative embodiment. During preproduction, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for maintenance and service 714, which may include modification, reconfiguration, refurbishment, and other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 8, an illustration of an aircraft is depicted in which an illustrative example may be implemented. In this example, aircraft 800 is produced by aircraft manufacturing and service method 700 in FIG. 7 and may include airframe 802 with a plurality of systems 804 and interior 806. Examples of systems 804 include one or more of propulsion system 808, electrical system 810, hydraulic system 812, and environmental system 814. Any number of other systems may be included. Although an aerospace example is shown, different illustrative examples may be applied to other industries, such as other industries utilizing composite materials.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Apparatuses and methods embodied herein may be employed during at least one of the stages of aircraft manufacturing and service method 700. One or more illustrative examples may be used during component and subassembly manufacturing 706, system integration 708, or maintenance and service 714 of FIG. 7. For example, layered carbon fiber 102 formed by layered carbon fiber forming process 116 may be used to form a component of aircraft 800, during component and subassembly manufacturing 706. As another example, layered carbon fiber 102 formed by layered carbon fiber forming process 116 may be used to form a composite structure to be used as a replacement part during maintenance and service 714 of FIG. 7.

Apparatuses and methods embodied herein may be employed in manufacturing at least one component of aircraft 800. For example, layered carbon fiber 102 formed by layered carbon fiber forming process 116 may be used in a composite material in a component of one of airframe 802 or interior 806.

The illustrative examples provide a carbon fiber with a thin carbon nanotube (CNT) yarn at its core. The carbon nanotube (CNT) yarn may be thinner than conventionally used carbon nanotube yarn. The illustrative examples provide a method to be performed on a carbon nanotube yarn. In some illustrative examples, the carbon nanotube yarn has a diameter approximately 2 microns.

The carbon nanotube yarn is drawn through a bath of PAN at a given speed to coat it with an engineered thickness of PAN. The method then takes that carbon nanotube yarn and PAN coating through carbonization and graphitization ovens to convert the PAN to graphitic carbon.

The illustrative examples present a layered carbon fiber that is a high modulus carbon fiber. In some illustrative examples, the thickness of the layered carbon fiber is in the 3 micron to 10 micron diameter range.

The illustrative examples present a layered carbon fiber with little to no amorphous carbon. By reducing the amorphous carbon layered carbon fiber of the illustrative examples has a higher modulus than conventional carbon fibers with amorphous carbon centers.

The layered carbon fiber comprises a core of graphitic carbon in the form of carbon nanotubes, to increase the modulus of the fiber. Replacing the amorphous carbon of conventional carbon fibers with carbon nanotubes (CNTs) will increase the modulus of each layered carbon fiber relative to a conventional carbon fiber. Increasing the modulus of fibers used in a composite also increases the modulus of the composite laminate. Using layered carbon fibers may also reduce the weight of the composite laminate as carbon nanotubes (CNTs) are less dense than amorphous carbon.

The layered carbon fibers can be used as a replacement for traditional carbon fibers in composite prepregs and resin infusion carbon blanks. The insertion of the layered carbon fibers presents no change to processing of composite materials. The improved properties of the layered carbon fiber are imparted to a composite material including the layered carbon fiber.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    coating a carbon nanotube yarn with polyacrylonitrile and propelling the carbon nanotube yarn through the polyacrylonitrile with a first roller to form a coated carbon nanotube yarn; and
    converting the polyacrylonitrile to crystalline carbon and after commencing the conversion, propelling the coated carbon nanotube yarn with a second roller without displacing the polyacrylonitrile on the coated carbon nanotube yarn to form a layered carbon fiber with a sheath of the crystalline carbon and a core of the carbon nanotube yarn.

2. The method of claim 1, wherein converting the polyacrylonitrile to crystalline carbon comprises:
    applying a carbonization process to convert the polyacrylonitrile to a carbon layer; and
    applying a graphitization process to convert the carbon layer to the crystalline carbon;
    wherein the second roller is positioned inside the carbonization process or after the carbonization process.

3. The method of claim 2, wherein applying the carbonization process comprises applying the carbonization process at a temperature in a range of 800 degrees Celsius to 1,200 degrees Celsius.

4. The method of claim 2, wherein applying the graphitization process comprises applying the graphitization process at a temperature in the range of 1,200 degrees Celsius to 3,000 degrees Celsius.

5. The method of claim 2, wherein the second roller is positioned inside or following the carbonization process.

6. The method of claim 2, wherein the first roller is positioned within the polyacrylonitrile bath and wherein the second roller is positioned inside or following the carbonization process.

7. The method of claim 2, wherein the carbonization process is between the first roller and the second roller.

8. The method of claim 1, wherein the carbon nanotube yarn has a diameter in the range of 1.5 microns to 2.5 microns.

9. The method of claim 1, wherein the layered carbon fiber has a diameter in the range of 3 microns to 10 microns.

10. The method of claim 1, wherein coating the carbon nanotube yarn with polyacrylonitrile comprises sending the carbon nanotube yarn through a bath of polyacrylonitrile.

11. The method of claim 10 further comprising:
    adjusting a temperature of the polyacrylonitrile in the bath and a speed of the carbon nanotube yarn passing through the bath to achieve a desired thickness of polyacrylonitrile on the coated carbon nanotube yarn.

12. The method of claim 11, wherein the coated carbon nanotube yarn has a diameter in the range of 5 microns to 13 microns.

13. The method of claim 1 further comprising:
    forming an aircraft component using a composite material comprising the layered carbon fiber.

14. The method of claim 1, wherein the first roller is positioned within a polyacrylonitrile bath.

15. The method of claim 1, wherein the second roller contacts the carbon nanotube yarn after the polyacrylonitrile is converted to crystalline carbon.

16. A method comprising:
    dip-coating a carbon nanotube yarn with polyacrylonitrile by pulling the carbon nanotube yarn through a polyacrylonitrile bath with a first roller;
    forming a carbon layer on the carbon nanotube yarn by performing a carbonization process on the polyacrylonitrile and propelling the carbon nanotube yarn having the carbon layer with a second roller; and
    forming a sheath of crystalline carbon on the carbon nanotube yarn by performing a graphitization process on the carbon layer.

17. The method of claim 16, wherein forming the carbon layer comprises:
    heating the polyacrylonitrile on the carbon nanotube yarn at a temperature in the range of 800 degrees Celsius to 1,200 degrees Celsius to remove hydrogen and nitrogen atoms and form the carbon layer from the polyacrylonitrile on the carbon nanotube yarn.

18. The method of claim 16, wherein forming the sheath comprises:
    heating the carbon layer on the carbon nanotube yarn at a temperature in the range of 1,200 degrees Celsius to 3,000 degrees Celsius.

19. The method of claim 16, wherein the carbon nanotube yarn has a diameter in the range of 1.5 microns to 2.5 microns.

20. The method of claim 16, wherein the sheath of crystalline carbon and the carbon nanotube yarn form a layered carbon fiber with a diameter in the range of 3 microns to 10 microns.

21. The method of claim 16, further comprising:
    adjusting a temperature of the polyacrylonitrile bath and a speed of the carbon nanotube yarn passing through the polyacrylonitrile bath during the dip-coating to achieve a desired thickness of polyacrylonitrile on the carbon nanotube yarn.

22. The method of claim 16, wherein the carbon nanotube yarn and polyacrylonitrile together have a diameter in the range of 5 microns to 13 microns.

23. The method of claim 16 further comprising:
    forming an aircraft component using a composite material comprising the sheath of crystalline carbon on the carbon nanotube yarn.

24. The method of claim 16, wherein the first roller is positioned within the polyacrylonitrile bath.

25. The method of claim 16, wherein the second roller is positioned inside or following the carbonization process.

26. The method of claim 16, wherein the first roller is positioned within the polyacrylonitrile bath and wherein the second roller is positioned inside or following the carbonization process.

27. The method of claim 16, wherein the carbonization process is between the first roller and the second roller.

28. The method of claim 16, wherein the second roller contacts the carbon nanotube yarn after the carbon layer is formed.

* * * * *